Aug. 25, 1953     F. J. YOUNG     2,650,065
CONSOLIDATED RIG
Original Filed July 29, 1944     4 Sheets-Sheet 2
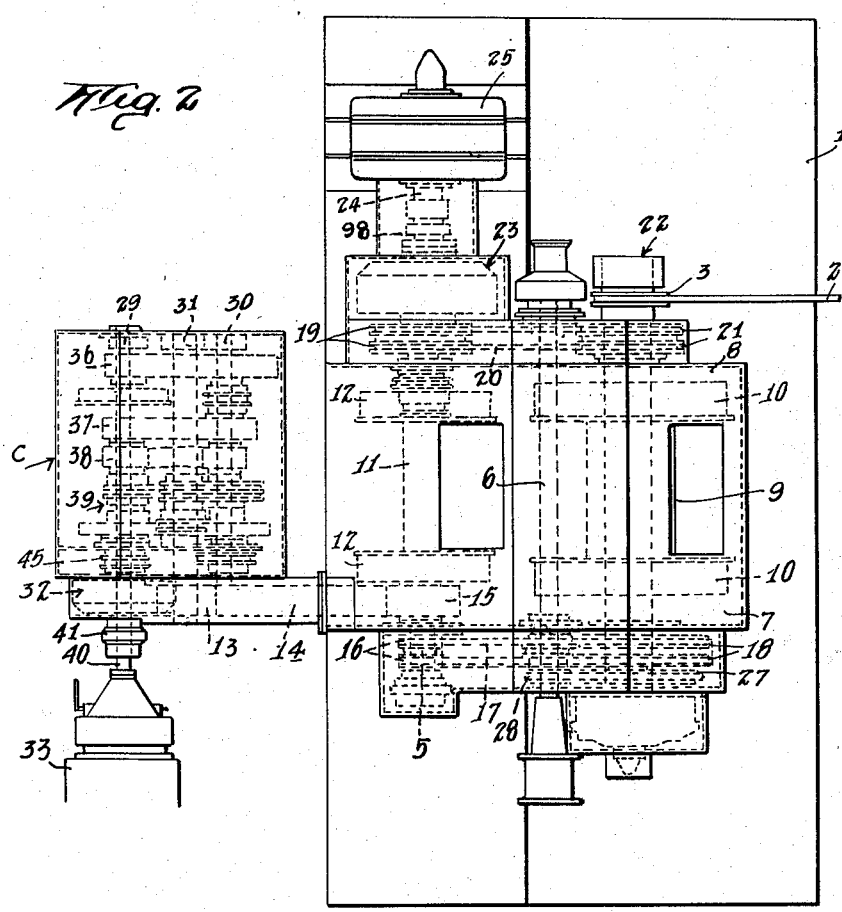
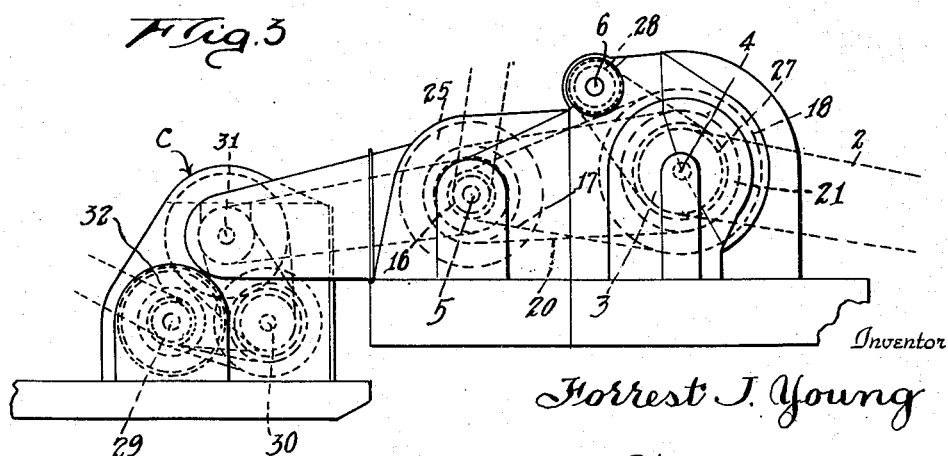

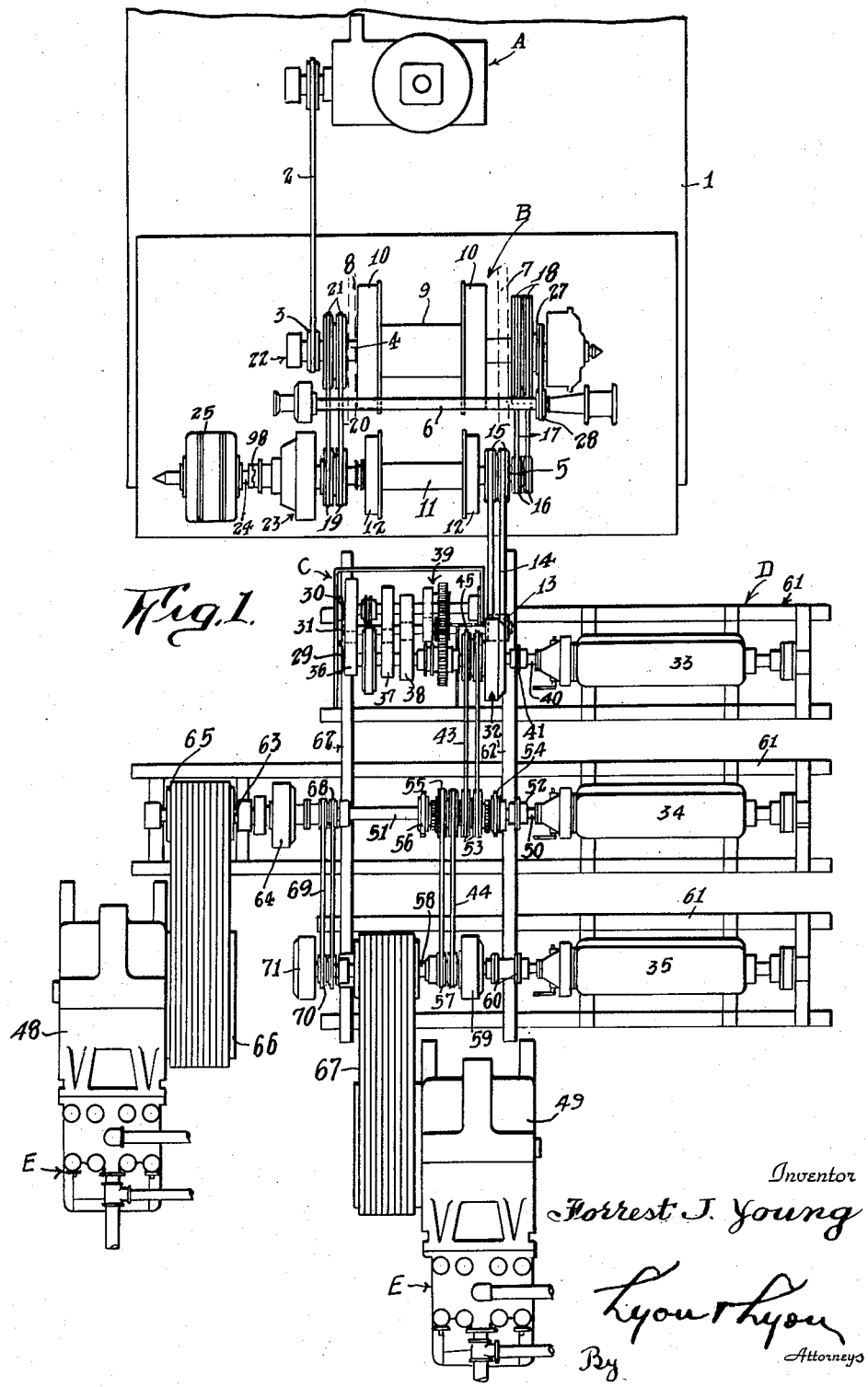

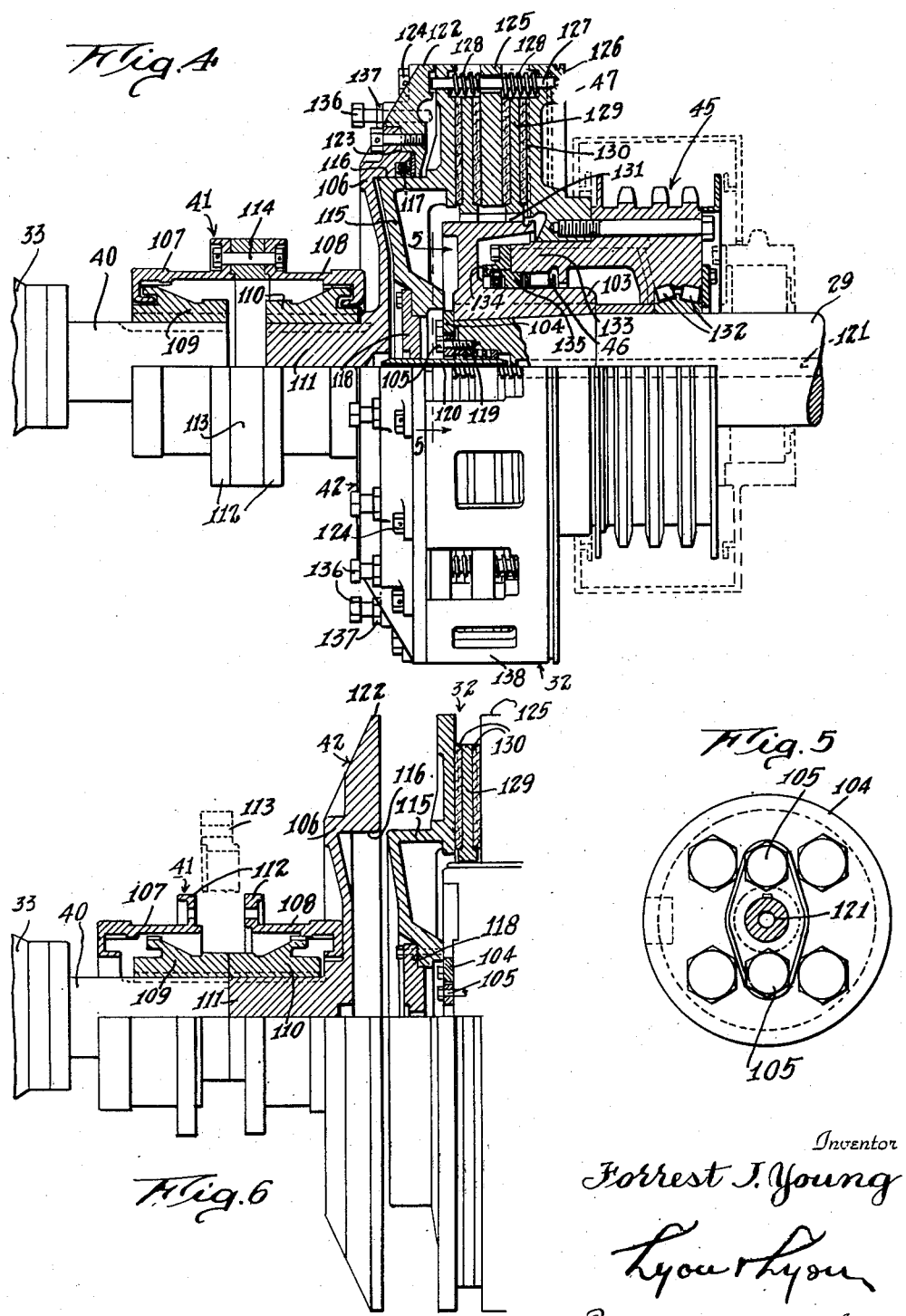

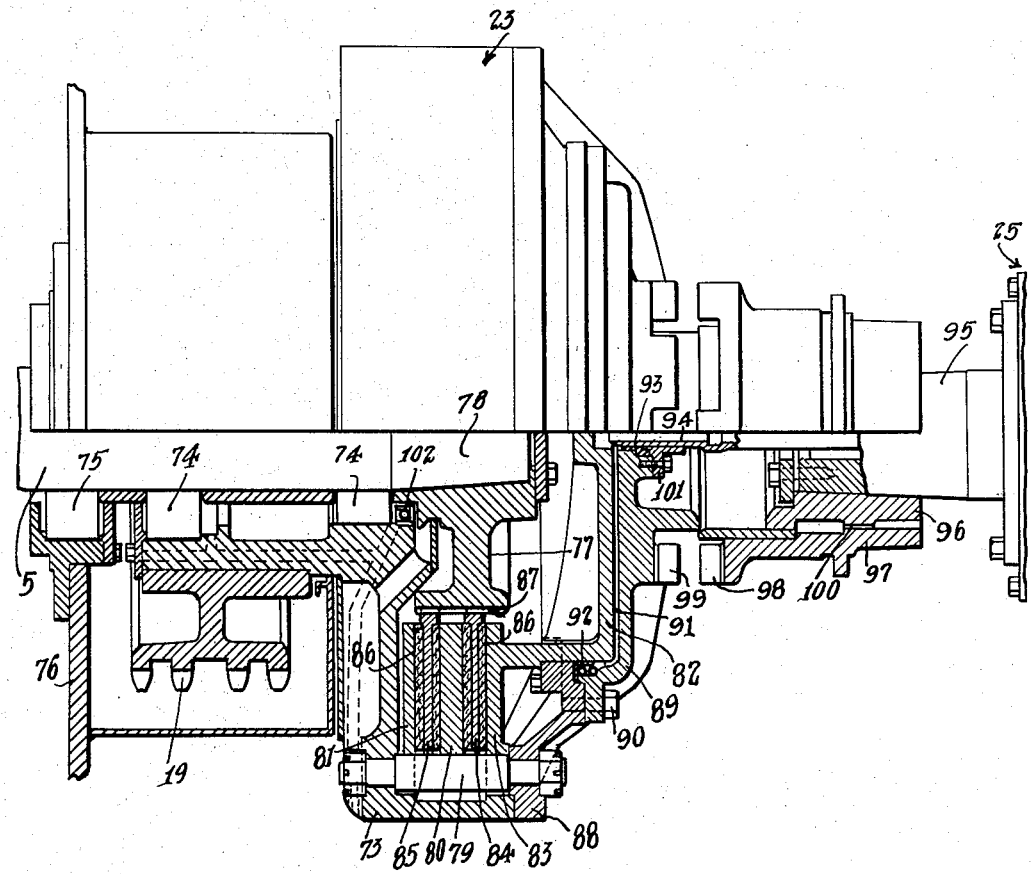

Patented Aug. 25, 1953

2,650,065

UNITED STATES PATENT OFFICE 2,650,065

CONSOLIDATED RIG

Forrest J. Young, Los Angeles, Calif., assignor to The National Supply Company, Pittsburgh, Pa., a corporation of Pennsylvania Original application July 29, 1944, Serial No. 547,264, now Patent No. 2,536,483, dated January 2, 1951. Divided and this application May 19, 1950, Serial No. 163,059

5 Claims. (Cl. 254—187)

This invention relates to consolidated rigs and is more particularly related to drilling rigs as employed in the drilling of wells. This is a division of my copending application for Consolidated Rig, Serial No. 547,264, filed July 29, 1944, now Patent No. 2,536,483, granted January 2, 1951.

It is an object of this invention to provide a consolidated rig wherein the operating elements as are combined in such a rig are so arranged as to permit of great flexibility of operation, greater utilization of the space in the derrick, and greater ease of control permitting the maximum utilization of power input to provide for the grestest efficiency of operation.

Another object of this invention is to provide a drilling rig which includes a novel arrangement of drum shaft, line shaft, multiple speed transmission and brake means so arranged as to permit for maximum utilization of the space available.

Another object of this invention is to provide a drilling rig including a hoisting mechanism composed of a drum shaft, line shaft or countershaft variable speed transmission and incorporating a hydraulic brake mounting operatively associated with the line or countershaft.

Another object of this invention is to provide a consolidated drilling rig which includes a line shaft and a drum shaft drawworks in which provision is made for driving the drum shaft from the line shaft through pneumatically operated friction clutches.

Other objects and advantages of this invention it is believed will be apparent from the following detailed description of a preferred embodiment thereof as illustrated in the accompanying drawings.

In the drawings:

Figure 1 is a schematic plan view of the drilling rig embodying my invention.

Figure 2 is a top plan view of the drilling rig drawworks and transmission units illustrating only a fragment of one engine.

Figure 3 is a side elevation of the structure illustrated in Figure 2.

Figure 4 is an elevation in half section of the pneumatic friction clutch employed for releasably connecting the driven shaft of the transmission with a power unit or engine.

Figure 5 is an end view taken substantially on the line 5—5 of Figure 4.

Figure 6 is a further view similar to Figure 4 but illustrating the clutch element separated to permit replacement, removal or repair of the clutch elements without disassembling the drilling rig.

Figure 7 is an elevation in half horizontal section of the line or countershaft pneumatic clutch assembly for releasably clutching the line or countershaft with the drum shaft sprocket and rotary machine drive means and providing the connecting means for engagement of the hydrulic brake therewith.

In the preferred embodiment of my invention I have illustrated the consolidated rig as being composed of the following units, namely: A rotary unit A, drawworks unit B, a multiple speed transmission unit C, a power unit D, and a pumping unit E, all of which units are commonly employed in the rotary process of drilling wells.

The rotary unit A may be of any suitable or desirable construction as is commonly utilized in this art for rotating the drill pipe, not shown. The drawworks unit B is adapted to be positioned upon the derrick floor 1 in operative relation to the rotary machine A so that the rotary machine may be driven through the medium of the transmission connection 2 from the rotary machine drive sprocket 3 carried upon the drum shaft 4 of the drawworks B. The drawworks unit B includes the drum shaft 4, a line or countershaft 5 which carries a sand reel, and a cathead shaft 6, all of which are supported between spaced frame elements 7 and 8 which may be of any suitable or desirable construction and support bearings upon which the respective shafts are journaled.

Secured to the drum shaft 4 is a drum 9 which is customarily provided with brake rims 10 at its opposed ends over which the brake bands are mounted in a manner well understood in the art.

Secured to a line shaft 5 is a sand reel 11 which likewise may be provided at its opposed ends with brake drums 12 upon which brake bands are mounted. The line shaft 5 is adapted to be driven from the driven sprocket 13 of the transmission unit C through the medium of a multiple chain drive 14 which drives the line shaft driven sprocket 15 which is in turn secured to the line shaft 5. Mounted upon the line shaft 5 is a low speed drum shaft drive sprocket 16 over which there is mounted multiple drive chains 17 which in turn drive a corresponding low speed drive sprocket 18 journaled on the drum shaft 4. At the opposed end of the line shaft 5 there is journaled upon the shaft a high speed drum shaft and rotary drive sprocket 19. A plurality of chains 20 connect the sprocket 19 with a larger driven sprocket 21 journaled on the end of the drum shaft 4 opposite to the low speed drive sprocket 18. Likewise journaled upon this drum shaft 4 in operative relationship with the sprocket 21 is the rotary machine drive sprocket 3 which is adapted to be releasably or selectively clutched to the sprocket 21 through the medium of a clutch mechanism of the character illustrated in the copending application of M. R. Gallimore, filed August 4, 1944, Serial No. 548,019, for "Sprocket Mounting," now Patent No. 2,421,875.

This clutch mechanism as indicated at 22 permits the sprocket 21 to be either clutched to the shaft 4 or to the rotary machine drive sprocket 3. The drive sprocket 19 for this transmission unit is releasably clutched to the line shaft 5 through the medium of a pneumatic clutch 23 as will hereinafter be specifically described.

Mounted in alignment with the line shaft 5 is a shaft 24 upon which a hydraulic brake 25 is supported. The shaft 24 is adapted to be connected to the line shaft 5 through the medium of the housing of the clutch 23 and through the medium of the jaw clutch 98. The jaw clutch 98 provides the means for releasably clutching the shaft 24 to the housing of the clutch 23, and the housing of the clutch 23 is rotatably mounted upon the line shaft 5. The chain 20 is used for driving the spooling drum 9 from the line shaft 5 at a reduced speed and also for driving the brake 25 from the spooling drum 9 at a higher speed and independently of the line shaft 5.

Means are also provided whereby the cathead shaft 6 is driven, which means includes a sprocket 27 mounted on the drum shaft 4 in alignment with a driven sprocket 28 mounted on the cathead shaft 6 and connected through the medium of a drive chain.

The transmission unit C includes a driven shaft 29, an intermediate shaft 30 and a drive shaft 31, providing a multiple speed and reverse drive between the engine unit D and the driven sprocket 15 secured to the line shaft 5 of the drawworks. Interposed between the transmission unit C and the engine unit D is a pneumatically actuated clutch 32 which provides a means for selectively engaging driven shaft 29 of the unit C with the sprocket 45 driven from the engine 34 or 35 or directly with the engine 33. The driven sprocket 13 of the transmission unit C is secured to the driving shaft 31 and this driving shaft 31 is adapted to be driven in either forward or reverse direction through the medium of the driving connections provided between the shafts 29, 30 and the driven shaft 31 of the transmission unit C. The transmission unit C also provides a multiple speed drive, and these speeds are provided by the chain and sprocket connections as indicated wherein the low speed drive is generally designated at 36, the second speed transmission connection at 37, and the high speed connection at 38. The reverse drive is generally indicated at 39.

As heretofore stated, the transmission unit C is adapted to be driven from any one of the engines 33, 34 and 35 of the power unit D. The engine shaft 40 of the engine 33 is connected through the medium of a spacer coupling 41 (Figure 4) with the spider 42 of the clutch 32. The engines 34 and 35 have their transmission connections 43 and 44 related and connected so as to enable the driving of the sprocket 45 which is journaled on bearings 46 (Figure 4) on the shaft 29 of the transmission unit C and is secured to collar element 47 of the clutch 32. The pump units E are adapted to be driven from the engines of the power unit D. The pump unit includes two mud pumps 48 and 49. The pump 48 is primarily driven from the engine 34.

The power unit D includes the there internal combustion motors 33, 34 and 35 which are adapted to be utilized singly or compounded for the purpose of providing the necessary power to carry on the required operations. The utilization of the three motors also permits the carrying on of the operations with the maximum of efficiency only utilizing such power as may be required for each individual operation.

The engine 33, as heretofore stated, is coupled through the clutch 32 with the transmission unit C. The engine 34 has its drive shaft 50 secured to an intermediate shaft 51 through the medium of a coupling 52. Journaled upon the shaft 51 is a multiple chain sprocket 53 which is adapted to be releasably clutched to the shaft 51 through the medium of a suitable clutch herein indicated as the jaw clutch 54.

The multiple chain 43 is trained over the sprocket 53 and in turn over the sprocket 45 of the transmission unit clutch 32. Journaled on the shaft 51 adjacent the multiple chain sprocket 53 is a second multiple chain sprocket 55 adapted to be driven from the engine 35 through the transmission connection 44. The sprocket 55 is adapted to be releasably coupled to the shaft 51 by means of a jaw clutch 56. The transmission connection 44 is driven by a multiple chain sprocket 57 journaled on the engine jack shaft 58 and operatively connected with the air operated friction clutch 59 in a manner to be hereinafter specifically set forth.

The jack shaft 58 is releasably coupled with the drive shaft of the engine 35 by means of an air operated clutch 59 of any suitable or desirable construction. A coupling 60 is interposed in this transmission connection to provide for the desired spacing of the engine 35. The three engines 33, 34 and 35, together with their associated shafts, are supported on a suitable framework indicated at 61 which provides a skid frame for each engine, and these skid frames are coupled together by means of connecting frame members 62 and 62' which permits the transmission connections from the engines to be separately handled and the engines to be moved to their desired position on their respective skid frames.

The means for driving the pumps 48 and 49 of the pumping unit E are, as herein illustrated, such as to permit the two pumps 48 and 49 to be driven together to produce the desired volume of drilling fluid which is required for carrying out normal operations. Means are also provided whereby one of these pumps, i. e., the pump 49, may be driven at low speed to provide a high pressure source of drilling fluid under pressure for carrying out certain desirable operations in the drilling of the well as, for example, to provide high pressure drilling fluid that may be required in certain fishing or corrective operations often necessarily carried out in the drilling procedure.

Thus it will be observed that the shaft 51 is positioned in line with the pump countershaft 63 and is adapted to be releasably coupled to the shaft 63 through the medium of an air-operated friction clutch 64. The pump countershaft 63 and clutch 64 are supported by an extension of the skid frame 61 of the engine 34.

Carried by the pump countershaft 63 is a multiple V-belt pulley 65 over which multiple V-belts are trained to drive driven V-belt pulley 66 of the pump 48. Similarly, the pump 49 is driven by means of a multiple V-belt pulley transmission 67 from the engine countershaft 58. The engine countershaft 58 is journaled on suitable bearings carried by the frame members 62 and 62'. Means are provided so that the pump 49 may be driven at a reduced speed to give a high pressure output, which means includes the driving of the transmission connection 44 from the engine 35 through to the sprocket 55 which is then clutched to the engine countershaft 51 so as to drive the shaft 51 from the engine 35. Secured to the shaft 51 is a multiple chain sprocket 68 over which there is trained a multiple chain 69 which drives the multiple chain sprocket 70 journaled upon the engine countershaft 58. A similar air-operated friction clutch 71 is provided for clutching the sprocket 70 to the shaft 58 so that the pump 49 is driven by means of the transmission connections 67.

The drawworks unit as illustrated in Figure 7 includes a hydraulic brake 25 which is positioned in alignment with and is adapted to be operatively coupled to the lineshaft 5 so as to provide a brake means for braking the rotation of the drumshaft and hoisting drum carried thereby.

The hydraulic brake 25 is coupled to the lineshaft 5 in such manner as to permit it to be easily removed therefrom or so as to permit the displacement of the coupling means when it is necessary or desirable to repair or replace elements of the intervening clutch 23 which provides a portion of the coupling means between the lineshaft 5 and the shaft of the hydraulic brake 25. The connecting means are so arranged as to permit displacement thereof in such manner as to enable the repair or replacement of elements of the clutch without the necessity of moving either the drawworks or the hydraulic brake away from each other. The coupling means is preferably in the form illustrated in Figure 7 wherein it will be noted that the drive sprocket 19 is carried upon and secured to clutch housing 73 of the clutch 23. The housing 73 is in turn journaled upon bearings 74 upon the projecting end of the shaft 5. The bearing 75 indicates the supporting bearing for the shaft 5 where it projects through the side plate 76 of the drawworks frame plate.

A clutch spider 77 is secured to the tapered end 78 of the shaft 5 so as to rotate therewith.

Carried slidably upon the clutch housing pins 79 is an intermediate clutch ring 80 and an inner clutch ring 81. A clutch piston 82 provides the outer clutch ring 83. Positioned between these clutch rings are the clutch plates 84 and 85 carrying appropriate facings 86. Clutch rings 84 and 85 are suitably splined as indicated at 87 to the clutch spider 77.

The housing 73 has secured thereto by means of pins 79 an end plate 88 which in turn carries the clutch closure end cap 89 through the medium of the cap screws 90. The cap 89 is thus positioned in spaced relation away from the piston 82 providing a pressure chamber 91 which is sealed by means of a suitable packing 92 at its outer periphery and through the medium of a suitable annular seal 93 interposed between the interior bore of the cap 89 and the hydraulic fluid conduit 94 which extends axially through the shaft 95 of the hydraulic brake. Secured to the tapered end of the hydraulic brake shaft 95 is a coupling collar 96 upon the outer surface of which there is splined a jaw clutch collar 97.

The clutch collar 97 is provided at its outer end with clutch jaws 98 adapted to be engaged with corresponding clutch jaws 99 formed on the end face of the cap 89.

The splines 100 which connect the coupling collar 96 with the clutch collar 97 permit endwise movement of the clutch collar 97 with relation to the collar 96 permitting the movement of the clutch jaws 98 to the right as viewed in Figure 7 to a position which provides a gap between the end of the shaft 95 and the end surface of the cap 89. The conduit 94 extends entirely through the brake shaft 95 and may be withdrawn longitudinally therethrough upon release of the packing 93 and removal of the packing ring 101 thereof.

The space provided between the end of the shaft 95 and the end of the cap 89 is sufficient to permit the cap 89 to be removed by removal of its attaching screws 90 transversely of the axis of the shafts 5 and 95. The removal of the cap 89 permits access to the clutch 23 so that its corresponding elements may be removed and replaced or repaired as required. This operation is thus performed without the necessity of moving the drawworks unit B or removal of the heavy hydraulic brake 25 from their positions.

A rotary seal 102 is provided between the clutch spider 77 and the clutch housing 73. The jaw clutch provided by the clutch collar 97 of the clutch jaws 99 of the cap 89 provides the means for coupling the hydraulic brake 25 to the line shaft 5 so that it may be utilized to brake the rotation of the drumshaft 4 and the drum 9 carried thereby. It will thus be observed that the hydraulic brake 25 is removed to a position to the rear of the hoisting drum 9 and drumshaft 4, permitting greater freedom of access to the operating parts of the drawworks unit B and the controls thereof (not illustrated).

Fluid under pressure is supplied through the conduit 94 and hence into the chamber 91, and this fluid under pressure moves the piston 82 longitudinally of the shaft 5 to actuate the friction clutch and thereby couple the sprocket 19 to the shaft 5.

In Figures 4 and 5 I have illustrated the structure of the pneumatic clutch employed for coupling the power units to the driven shaft 29 of the transmission unit C. As illustrated, this clutch includes a clutch spider 103 which is secured to the tapered end of the shaft 29 and is held in place by means of an end ring 104 secured to the end of the shaft by means of the screws 105. A clutch housing 106 is releasably coupled through the medium of the coupling 41 to the drive shaft 40 of the engine 33. This coupling 41 includes a pair of complementary coupling collars 107 and 108 which are splined to the internal coupling collars 109 and 110 respectively secured to the shaft 40 and to the stub shaft 111 formed as an extension of the housing 106. The coupling collars 107 and 108 are provided with radial flanges 112 between which there is positioned a spacer ring 113 of a width which will permit longitudinal movement in the direction of the axis of the shaft 29 sufficient to permit the replacement and repair of the parts of the pneumatic clutch when the spacer ring 113 is removed. The spacer ring 113 is held in position by means of bolts 114, and upon removal of these bolts the collars 107 and 108 may be moved axially through the medium of their spline connection with the internal collars 109 and 110 sufficient to permit the spacer ring 113 to drop out of position.

The assembly of the clutch 32 includes a clutch plate piston 115 which is carried in concentric position within the cylinder provided by the annular wall 116 of the housing 106. An annular packing ring 117 is provided to maintain a fluid-tight connection between the clutch plate piston 115 and the cylinder wall 116 of the housing 106. The clutch plate piston 115 is provided with a central axis plate 118 secured thereto by means of suitable screws, the removal of which permits access to the securing plate 104 for the spider 103 and hence to the packing assembly 119 which mounts the air spear 120 axially of the shaft 29 for the delivery of air under pressure back of the piston 115 for the actuation of the clutch. Air under pressure is supplied to the hollow spear 120 through a longitudinal bore 121 formed lengthwise of the shaft 29, to the end of which shaft suitable pneumatic connection is provided for the supply of air under pressure for actuation of the clutch.

The clutch housing carries at its outer end an outer housing ring 122 which is seated upon an annular shoulder 123 of the housing 106 and provides an inwardly extending flange from the seat 123 which acts to compress the annular packing ring 117 in a packing recess formed in the cylinder 106.

The outer ring 122 carries a plurality of bolts 124 which extend through the clutch plate piston 115 through the intermediate clutch plate 125 and secures the opposite outer plate 126 in position. Interposed between the ring 122 and the clutch plate 126 are pins 127 carrying clutch springs 128 which normally act to urge the clutch plates into separated position. The clutch spider 103 carries intermediate clutch plates 129 which carry suitable clutch facing 130. The clutch plates 129 are secured to the spider 103 at the splines 131.

Secured within the inner aperture of the outer clutch plate 126 is the driving sprocket 45 which is rotatably supported coaxially of the shaft 29 upon axially spaced bearings 46 and 132.

The sprocket 45 includes an inwardly extending cylindrical portion 133, to the end of which there is secured a closure ring 134 which positions an annular packing ring 135 to maintain a fluid-tight connection within the interior of the clutch assembly. As this clutch is pneumatically actuated through the medium of the air pressure supplied through the bore 121 formed in the shaft 29, it is apparent that upon failure of the source of air under pressure, that the clutch could not be operated to provide a means of driving the rotary drilling rig in the event of failure of the pneumatic system.

For this reason I have provided a manual means in the clutch through the medium of which piston 115 may be moved in a direction of the axis of the shaft 29 to close the clutch in event of such failure.

The manual means provided include a plurality of set screws or studs 136 which are threaded through the outer housing ring 122 and extend into the interior thereof in position to engage the piston clutch ring 115 to thereby force the same in position to close the clutch. Lock nuts 137 are provided for locking the said studs in their adjusted position.

When it is desired to disassemble this clutch to make repairs or to replace the clutch plates thereof, or to replace any of the packing elements, it is only necessary to remove the spacer ring 113 as heretofore fully set forth to then remove the connecting bolts 124 which will permit the housing 106 to be removed from the assembly. The width of the spacer is determined by the amount the cylinder wall 116 overlaps the cylinder surface provided by the piston 115. Of course, it is not necessary that this spacer 113 be of a width to also accommodate for the width of the outer clutch housing ring 122, as this may likewise be removed from the housing 106. Upon removal of these elements, it is apparent that the piston 115 may be removed if it is desired to replace any of the clutch plates or the lining thereof, or if it is desired to repair or replace the packing 119 the end plate 118 may be removed, permitting access to this assembly.

It will be apparent from Figure 4 that a housing plate 138 is interposed between the housing ring 122 and the end plate 126. This ring is provided with suitable apertures enabling air to circulate to the clutch plates.

Having fully described my invention, it is to be understood that I do not wish to be limited to the details herein set forth, but my invention is of the full scope of the appended claims.

What I claim is:

1. In a well drilling drawworks, the combination of: a spooling drum adapted to spool and unspool cable for raising and lowering a drill string into a well hole, a large sprocket mounted coaxially of the spooling drum, means connecting said large sprocket in driving relation with said spooling drum, a lineshaft member, a sprocket member mounted coaxially of the lineshaft member and having a sprocket of smaller diameter than said large sprocket, clutch means for connecting said sprocket member to the lineshaft member, an endless chain connecting said sprockets so that the lineshaft member may drive the spooling drum at a reduced speed, a high-capacity energy-absorbing brake positioned coaxially of said members for resisting unspooling motion of the drum to impede free fall of the drill string, and additional clutch means for connecting the brake in driving relation with one of said members whereby the brake may be driven from the spooling drum through said endless chain at a higher speed independently of the other of said members.

2. In a well drilling drawworks, the combination of: a spooling drum adapted to spool and unspool cable for raising and lowering a drill string into a well hole, a large sprocket mounted coaxially of the spooling drum, means connecting said large sprocket in driving relation with said spooling drum, a lineshaft, a smaller sprocket rotatably mounted upon the lineshaft near one end thereof, clutch means for connecting said smaller sprocket to the lineshaft, an endless chain connecting said sprockets so that the lineshaft may drive the spooling drum at a reduced speed, a high-capacity energy-absorbing brake positioned coaxially of the line shaft for resisting unspooling motion of the drum to impede free fall of the drill string, and additional clutch means for connecting the brake in driving relation with said smaller sprocket whereby the brake may be driven from the spooling drum through said endless chain at a higher speed independently of the lineshaft.

3. In a well drilling drawworks, the combination of: a spooling drum adapted to spool and unspool cable for raising and lowering a drill string into a well hole, a large sprocket mounted coaxially of the spooling drum, means connecting said large sprocket in driving relation with said spooling drum, a lineshaft assembly including a lineshaft and a smaller sprocket mounted upon the lineshaft, an endless chain connecting said sprockets so that the lineshaft may drive the spooling drum at a reduced speed, a high-capacity energy-absorbing brake for resisting unspooling motion of the drum to impede free fall of the drill string, and clutch means for connecting the brake in driving relation with said lineshaft assembly whereby the brake may be driven from the spooling drum through said endless chain at a higher speed.

4. In a well drilling drawworks, the combination of: a spooling drum adapted to spool and unspool cable for raising and lowering a drill string into a well hole, a first sprocket mounted coaxially of the spooling drum, means connecting said sprocket in driving relation with said spooling drum, a second sprocket, means for rotatably mounting the second sprocket, an endless chain connecting said sprockets, releasable transmission connections for imparting rotation to said second sprocket to drive the drum, a high-capacity energy-absorbing brake mounted coaxially of the second sprocket for placing the brake in driving relation with said second sprocket to resist unspooling motion of the drum to impede free fall of the drill string, said second sprocket being operatively common to said driving and to said braking transmission connections.

5. In a well drilling device, the combination of: a drawworks having a spooling drum adapted to spool and unspool cable for raising and lowering a drill string into the well hole, a first sprocket mounted coaxially of the drum, means connecting said sprocket in driving relation with the drum, a lineshaft assembly including a second sprocket, an endless chain connecting said sprockets whereby the lineshaft assembly may drive the spooling drum to raise the drill string, a high-capacity energy-absorbing brake for resisting unspooling motion of the drum to impede free fall of the drill string, and clutch means on the lineshaft assembly for connecting the brake in driving relation therewith whereby the brake is driven from the spooling drum through said endless chain.

FORREST J. YOUNG.

References Cited in the file of this patent

UNITED STATES PATENTS

| Number | Name | Date |
|---|---|---|
| 2,161,075 | Morgan | June 6, 1939 |